G. C. LASARES.
REVOLVING TOY.
APPLICATION FILED JAN. 13, 1920.
1,385,559.
Patented July 26, 1921.
2 SHEETS—SHEET 1.
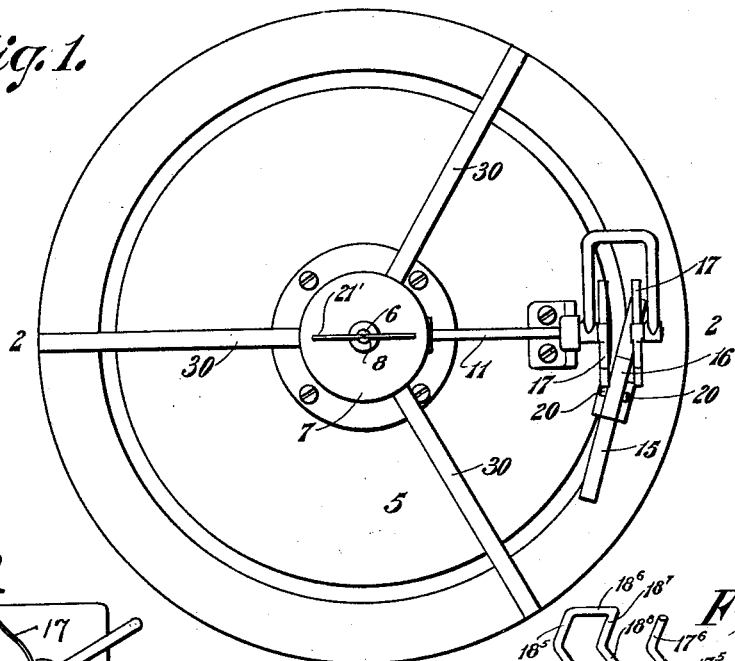
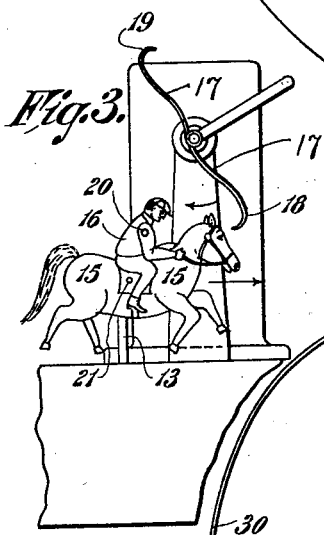
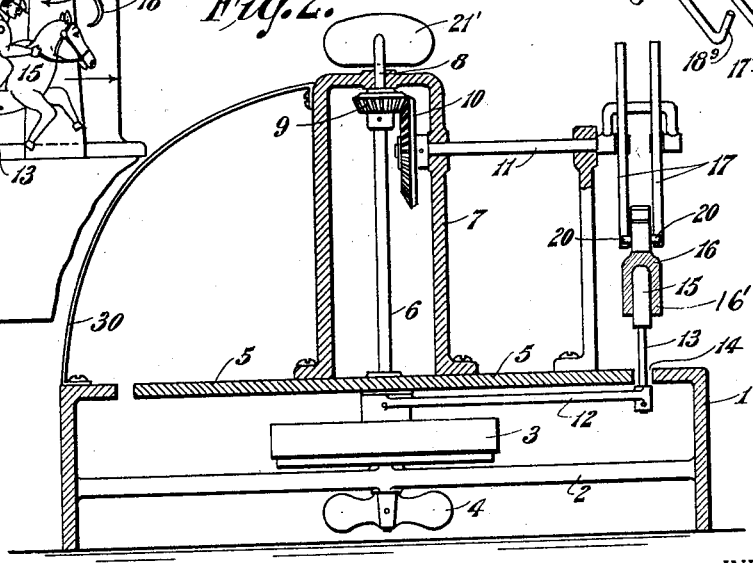
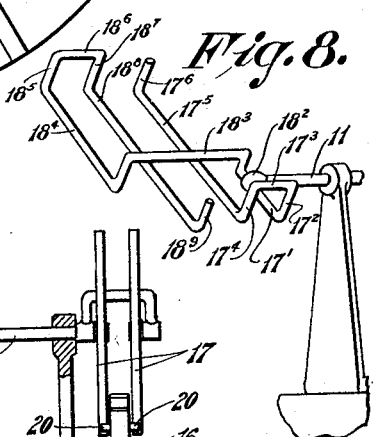
INVENTOR,
George C. Lasares,
BY Harry W. Bowen.
ATTORNEYS.

G. C. LASARES.
REVOLVING TOY.
APPLICATION FILED JAN. 13, 1920.
1,385,559.
Patented July 26, 1921.
2 SHEETS—SHEET 2.
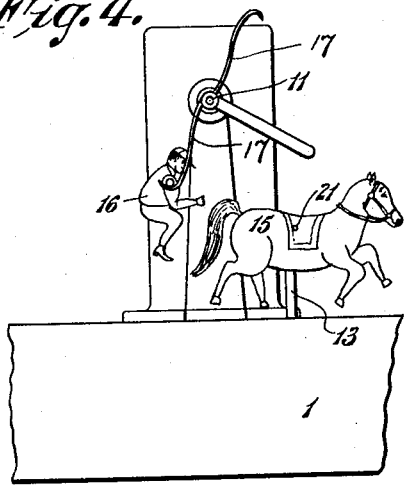
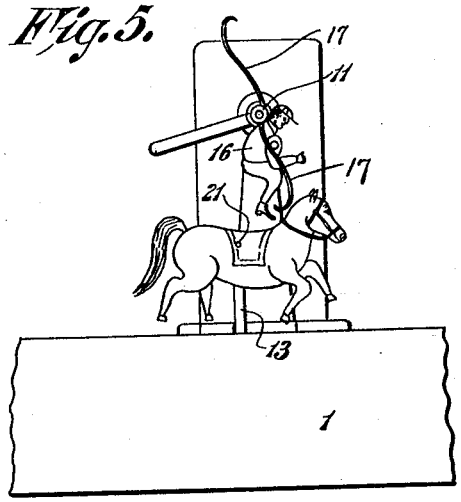
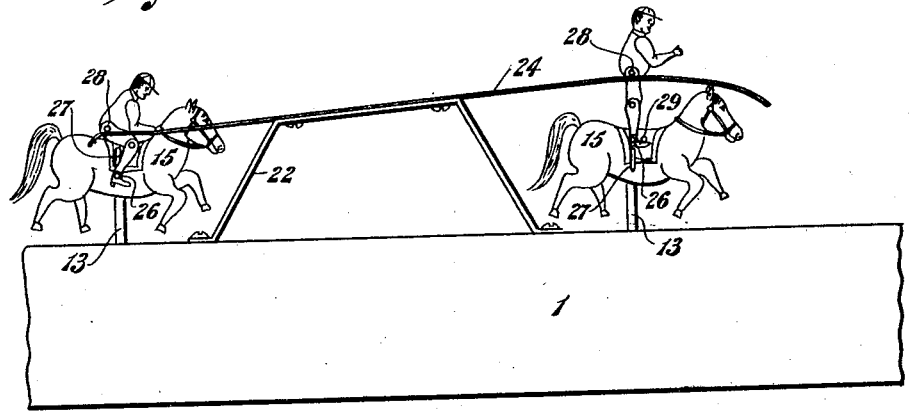
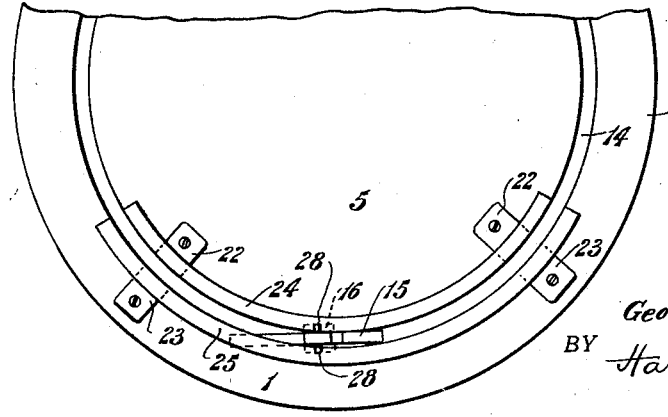
INVENTOR,
George C. Lasares,
BY Harry W. Bower
ATTORNEY.

UNITED STATES PATENT OFFICE.

GEORGE C. LASARES, OF SPRINGFIELD, MASSACHUSETTS, ASSIGNOR OF ONE-HALF TO LEON J. HARLEY, JR., OF SPRINGFIELD, MASSACHUSETTS.

REVOLVING TOY.

1,385,559.      Specification of Letters Patent.    Patented July 26, 1921.

Application filed January 13, 1920. Serial No. 351,167.

*To all whom it may concern:*

Be it known that I, GEORGE C. LASARES, citizen of the United States of America, residing at Springfield, in the county of Hampden and Commonwealth of Massachusetts, have invented certain new and useful Improvements in Revolving Toys, of which the following is a specification.

This invention relates to improvements in toys of the type in which a figure is rapidly revolved about a fixed support with means for operating the figure to illustrate, as in the present case, a horse and rider, and means for automatically removing and replacing the rider on the horse during each complete revolution of the horse. Means is also provided for partially removing the rider to illustrate actual riding conditions. The invention, broadly, comprises a base piece, a motor located therein and connecting means between the motor and the figure representing a horse and rider for rotating the same, means associated with or located adjacent the horse for removing the rider and for automatically replacing the same back on the horse again.

As a modification, means are shown for partially removing or lifting the rider from the horse and for replacing the same thereon again.

Referring to the drawings:

Figure 1 is a plan view showing the base piece, the continuous slot or opening therein, and the mechanism for automatically removing the rider from the horse.

Fig. 2 is a vertical sectional view on the line 2—2 of Fig. 1, showing the interior construction of the toy, the spring motor and connecting means therefrom for operating the figure representing the horse and the devices for automatically removing the rider therefrom.

Fig. 3 is a side elevational view of the horse or other animal and showing the rider thereon and about to be lifted from the animal by the mechanism shown immediately above the rider.

Fig. 4 illustrates the position of the parts after the rider has been lifted and the horse is still traveling.

Fig. 5 illustrates the position of the parts as the rider is about to be replaced on the animal.

Fig. 6 is a side elevational view of a modification showing a device for vertically lifting the rider and replacing the same on the animal, and Fig. 7 is a plan view of Fig. 6.

Fig. 8 is a modification of the revolving device for lifting the rider from and replacing the rider on the revolving animal.

Referring to the drawings in detail: 1 designates the base-piece of the device which comprises substantially an inverted member, 2 a bar extending across the same and on which is supported a suitable spring motor 3, 4 being the winding key for the motor. The cover portion is indicated at 5 and extending upwardly from the motor 3 is a shaft 6. The upper end of the shaft is supported in the housing 7 at the point 8. The shaft 6 carries a bevel gear 9 which meshes with the beveled gear 10, the gear 10 being twice the diameter of the gear 9 for the purpose of causing the shaft 11 to rotate at one half the speed of the shaft 6. Connected to the shaft 6 is an arm 12 having an upright member 13 secured thereto and which passes upward through the opening 14. The upright 13 carries the figure or horse indicated at 15 and the rider at 16, the legs 16′ of which are preferably weighted as indicated by the sectional line shading in order to maintain the rider in substantially a vertical position during the removal and replacing of the rider. If the rider is not weighted the sudden motion of the revolving member would throw the rider out of position. As the spring motor unwinds, the arm 12 is revolved, carrying the figure 15 around with it, and through the slot 14 by means of the upright 13. For the purpose of lifting the rider 16 from the horse the bent arms 17, which are connected to the shaft 11, are employed. The opposite ends of the arms being bent or curved in opposite directions, as indicated at 18 and 19. Projecting from the opposite sides of the rider are the pins 20, whereby, as the rider and horse are carried around by the upright 13, the bent ends 18 engage or hook under the pins 20 of the rider and lift him from the animal as shown in Figs. 3 and 4. The animal 15 then continues to be driven or carried around by the arm 13 and simultaneously with the movement of the animal the arms 17 are rotated whereby when the horse 15 has made a complete revolution the rider 16 is replaced, as shown in Fig. 5. The pins 20 readily permit the rider to slide down the arms 17 and be replaced on the horse again. For the purpose of retaining the rider in place on the horse, pins 21 are provided to engage the rider and hold him in place until again lifted by the operation as described. A suitable governor 21' may be secured at the upper end of the shaft 6. This is merely illustrative as other brake and speed regulating devices may be used.

Referring to construction shown in Fig. 8, in which a slightly different form of lifting and replacing device is employed, 18' designates a wire secured to the shaft 11 by soldering or otherwise indicated at $18^2$, and formed with an elevated bent portion $18^3$, a depressed portion $18^4$, the bent portions $18^5$, $18^6$, $18^7$, the second depressed portion $18^8$ and bent upright stop $18^9$. Also connected to the shaft 11 at the point $18^2$ is a second wire 17' having the bent stop portions $17^2$, $17^3$ and $17^4$, the depressed portion $17^5$ and the upright bent end portion $17^6$. This construction operates like the lifting and replacing construction shown in Figs. 1, 2 and 3. The pins 20 engage the portions $17^4$ and $18^9$, then as the shaft 11 is revolved, the pins of the rider 16 slide down the arms $17^5$ and $18^8$ until they engage the stops $18^5$ and $18^7$ where they will slide, permitting the rider to be replaced again. It should be noted that the space between the wires $17^5$ and $18^8$ is open at its ends to permit the rider to pass therethrough.

Referring to the modification shown in Figs. 6 and 7, Fig. 6 being a development of Fig. 7 in side elevation, mounted on the pieces 1 and 5 are the brackets 22 and 23. These brackets support the strips 24 and 25. As shown in Fig. 6, they are slightly inclined for the purpose of vertically lifting the rider, then allowing the rider to be replaced. In order to accomplish this, pins 26 project from the side of the rider near the foot portion. These pins slide in the openings 27 of the animal. Pins 28 are also provided on the rider for engaging the strips 24, whereby as the animal is carried around the pins 28 will slide up and the inclined strips 24 will bring the figure into an upright position, as shown, and when the figure reaches the end of the strips, it is automatically replaced on the animal by gravity.

In order to prevent the figure from tipping forward, pins 29 are provided.

It will be seen from this description that I have provided means for automatically causing the figure to be rotated similar to a merry-go-round, and means for automatically lifting and replacing the rider. Various modifications may be made in the device without departing from the scope and spirit of the invention, and the various devices included in this description.

For the purpose of rigidly maintaining the cover 5 and housing 7 suitable brackets 30 are employed extending from the upper end of the housing 7 to the base piece 1.

What I claim is:

1. In a rotary toy device, the combination, of a base-member, a motor located therein, an arm connected to said motor and driven by the same, a figured toy, comprising a horse and a rider, means for causing the horse and rider to move together, and means for automatically lifting the rider from the horse and returning the same to the horse and simultaneously with the movement of the horse.

2. In a toy apparatus, the combination, of a base-member, a motor mounted therein, an arm connected to the motor and supporting a figured toy, comprising a horse and rider, means driven from the motor and simultaneously therewith for automatically lifting the rider from and replacing the same on the horse during the operation of the apparatus, said means comprising rotatable hooks, which are bent in opposite directions, one end of the hooks being designed to lift the rider and the other to replace the same on the horse again.

3. In a rotatable toy device, the combination, of a supporting base piece, a figured toy, comprising a horse and a rider supported thereon, means for rotating the horse, means for automatically lifting the rider and means for automatically returning the rider to the horse, comprising a shaft connected to the motive power, a pair of arms for engaging the rider at a predetermined point in the path of rotation and returning the rider to the horse at a predetermined point in the path of rotation, as described.

4. In a rotatable toy device, the combination, of a rotatable device comprising a horse, a rider thereon, means for removing and replacing the rider on said device comprising a horse having stop portions to receive the rider, portions to permit the rider to slide therealong and other stop portions to arrest the sliding movements and permit the release and replacement of the rider on the rotatable device, and means for simultaneously rotating the rider with the device.

5. In a rotatable lifting and replacing device for the purpose described, the combination, of wires arranged in parallel relation to each other, said wires having bent or stop portions at their ends for lifting and releasing purposes and the space between said wires being open at its ends to permit an article to slide through the space and on the wires as described.

6. In a rotatable device, the combination, of a rotatable member, representing a horse, of a rider element representing a person, said rider having weighted portions for maintaining the same in substantially a vertical position during the operation of lifting and replacing the same away from and onto the rotatable member, and means for rotating the device, means for lifting and replacing the rider, and means for operating the latter means, as described.

7. In a toy device of the kind described, the combination, of a rotatable member representing a horse, a rider therefor, means for operating the member and the rider, means for lifting and replacing the rider on the horse during the operation of the horse, said means including hook devices spaced from each other having open ends to permit the rider to pass therethrough when the same is revolved.

8. In a toy device, the combination, of a rotatable member representing a horse, a device designed for support thereon, means for temporarily lifting the device therefrom at predetermined points in its rotary path during the operation of the rotatable member and for retaining the same lifted for a predetermined period and for replacing the device on the rotatable member again at the end of the lifted period.

GEORGE C. LASARES.